J. M. KERR.
SHOCK ABSORBER.
APPLICATION FILED JULY 14, 1921.
1,417,178.
Patented May 23, 1922.
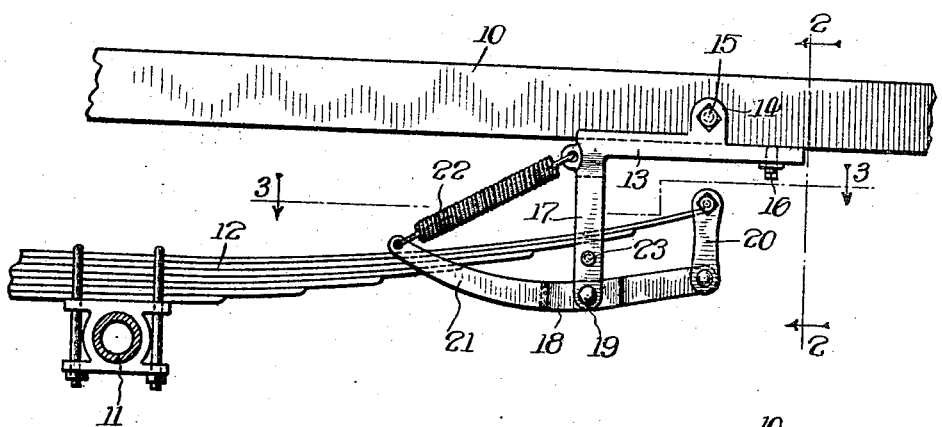
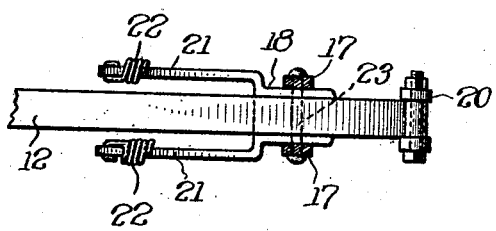
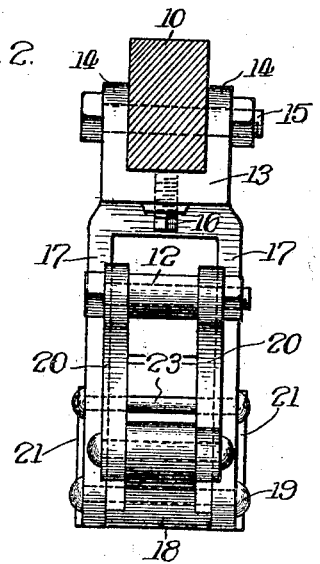
Inventor:
James M. Kerr,
By Charles J. Schmidt
Atty.
Witness:
T. J. Sauser.

UNITED STATES PATENT OFFICE.

JAMES M. KERR, OF CRAWFORDSVILLE, INDIANA.

SHOCK ABSORBER.

1,417,178.  Specification of Letters Patent.  Patented May 23, 1922.

Application filed July 14, 1921. Serial No. 484,644.

*To all whom it may concern:*

Be it known that I, JAMES M. KERR, a citizen of the United States, and a resident of Crawfordsville, in the county of Montgomery, State of Indiana, have invented certain new and useful Improvements in Shock Absorbers, of which the following is a specification.

My invention relates to shock absorber mechanism particularly adaptable for application on automotive vehicles to absorb the lesser shocks and to assist the vehicle springs in taking care of and softening the heavier shocks, and which will co-operate with the vehicle springs to retard and brake recoil action of the vehicle springs and to brake and check rebound of the vehicle frame.

On the accompanying drawing, I illustrate the construction, application and operation of my improved mechanism and on this drawing Fig. 1 is a side elevational view of one corner of a vehicle showing a vehicle spring and the application of the shock absorbing mechanism thereto and to the vehicle body, Fig. 2 is a view on plane 2—2, Fig. 1 and Fig. 3 is a view on plane 3—3, Fig. 1.

On the drawing 10 represents the vehicle frame work and 11 represents the axle. Secured on the axle is the semi-elliptic spring 12 whose one end may be secured directly to the vehicle framework but whose other end is connected therewith through my improved shock absorbing mechanism. This mechanism comprises a bracket member 13 secured to the vehicle framework. Preferably, I remove the shackle member which primarily connects the end of the spring with the vehicle framework and use the bolt hole at which the shackle was originally pivoted. Accordingly I provide ears 14 on the bracket member which receive the vehicle framework and through which and the shackle bolt hole the bolt 15 is inserted. I further provide a set screw 16 for the bracket which engages against the under side of the framework and assists the bolt in rigidly holding the bracket in place. At its inner end the bracket has the downwardly extending arms 17 which receive between them the end of the vehicle spring 12 and at their lower ends receive between them the shock absorber lever 18, the bolt 19 passing through the arms and through the lever intermediate the lever ends to thus fulcrum the lever. At its outer end the lever is connected by the link 20 with the outer end of the spring 12 and this link may be the shackle member which originally connected the spring with the vehicle framework. At its inner end the lever is bifurcated to provide the arms 21 which receive between them the spring 12, each arm being connected by a contractile spring 22 with the bracket 13. The weight of the vehicle framework instead of being directly transmitted to the outer end of the spring 12 is thus transmitted to the elastic shock absorber mechanism, the lever 18 rocking on its fulcrum against the resistance of the spring 22 as the vehicle spring vibrates up and down during travel of the vehicle. Extending through and between the arms 17 normally a short distance below the spring 12 is the abutment pin 23.

As the vehicle travels over a roadway the smaller short vibration bumps are practically all absorbed by the shock absorber attachment, the lever 18 rocking as the vehicle springs vertically vibrate, such rocking being resisted by the shock absorber springs 22, the short lesser shocks being thus absorbed before they reach the vehicle framework. The heavier shocks which cannot be entirely absorbed by the shock absorber springs will, nevertheless, be first received and their abruptness taken off by the shock absorber springs, the vehicle spring then receiving and taking up the balance of the shocks. The position of the lever fulcrum point can be such as will give the arms 21 the desired leverage advantage so that comparatively light and responsive springs 22 can be utilized.

During travel of the vehicle over a roadway which has large bumps and holes, the vehicle spring will be considerably compressed and will thereafter tend to recoil and throw the vehicle body upwardly. However, any recoil action of the spring will cause rocking of the lever 18 and the springs 22 will become effective so that the recoil action is braked and gradually snubbed. As the vehicle body tends to throw upwardly the abutment pin 23 will engage with the vehicle spring and the vehicle spring will then serve to retard and brake such upthrow. My improved shock absorbing attachment and the vehicle springs will therefore function and co-operate at all times to protect the vehicle body against shocks and strains while the vehicle is traveling over rough roadways. The shock absorbing mechanism is of very simple construction and can be quickly and readily applied to a vehicle without disturbing or changing the relative position of vehicle parts, and no changes are required on the vehicle. All that is necessary is to remove the bolt which ordinarily pivots the shackle member to the vehicle frame and secure to the frame in its stead the bracket member 13. The shackle is then swung down and connected to the outer end of the lever 18.

I do not desire to be limited to the exact construction and arrangement shown and described as changes could be made which would still come within the scope of the invention.

I claim as follows:

1. In a vehicle, the combination of the vehicle framework, the axle, a leaf spring secured on said axle at right angles thereto, an arm extending downwardly from said framework below said vehicle spring and a short distance inwardly of the spring end, a lever pivoted intermediate its ends on the lower end of said arm, a connection between the outer end of said lever and the spring end, a shock absorbing spring connecting between the inner end of said lever and the vehicle framework, and an abutment on said arm below said vehicle spring for engaging with said spring to cause said spring to snub recoil of the vehicle frame.

2. In a vehicle, the combination of the vehicle framework, the axle, a semi-elliptic spring secured on said axle at right angles thereto, a bracket secured on said framework above the spring end, arms on said bracket extending downwardly therefrom past the vehicle spring and a short distance inside of the spring end, a lever pivoted intermediate its ends between the ends of said arms, a link connecting the outer end of said lever with the spring end, the inner end of said lever extending upwardly past said vehicle spring, an elastic connection between the inner end of said lever and said bracket, and an abutment on said arm below the vehicle spring for engaging with said spring during recoil of the vehicle frame whereby said spring will snub such recoil.

In witness whereof, I hereunto subscribe my name this 9 day of July, A. D. 1921.

JAMES M. KERR.